March 16, 1943.  B. H. ADLER  2,313,723
CHANGEABLE LETTER SIGN
Filed June 13, 1940       5 Sheets-Sheet 1
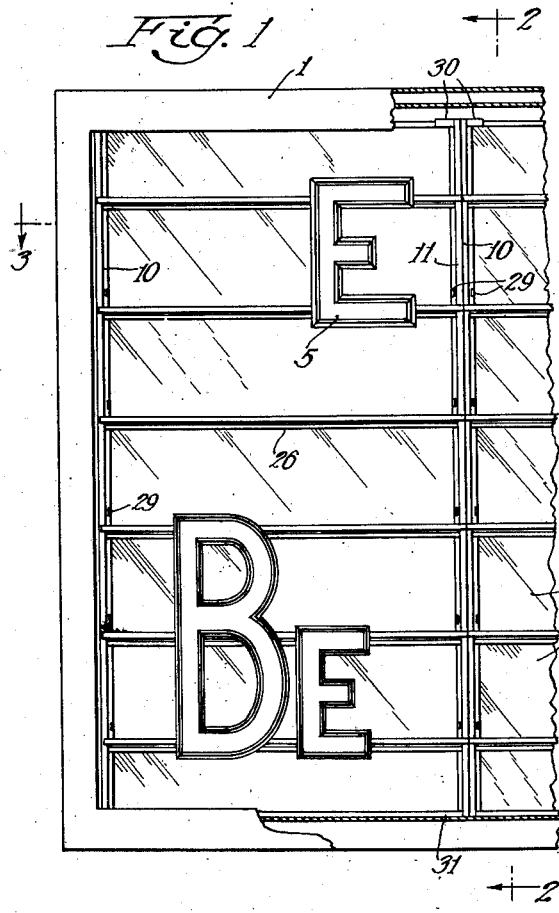
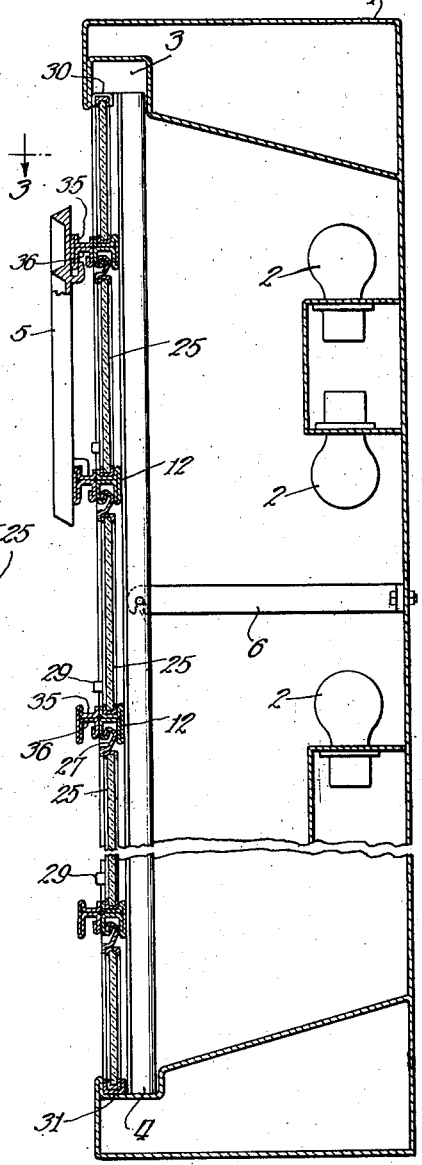
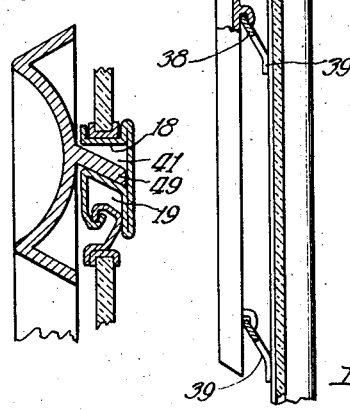
Inventor:
Benjamin H. Adler
By: Zabel, Carlson, Gritzbaugh & Wells
Attys.

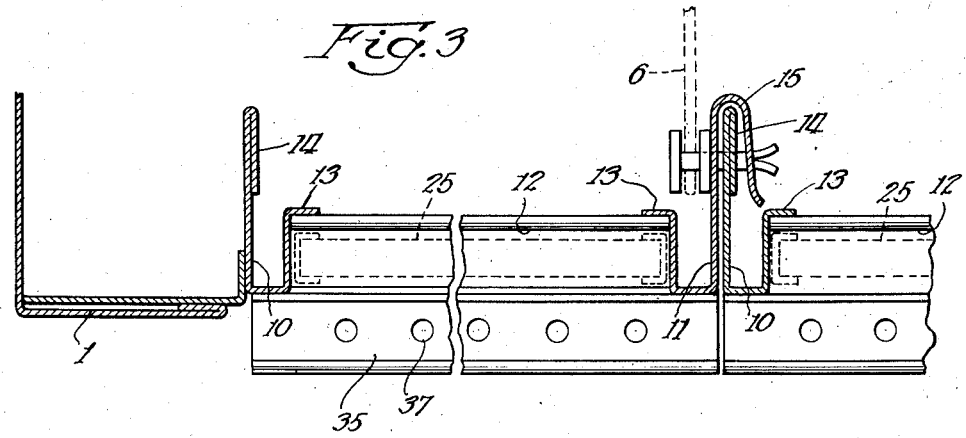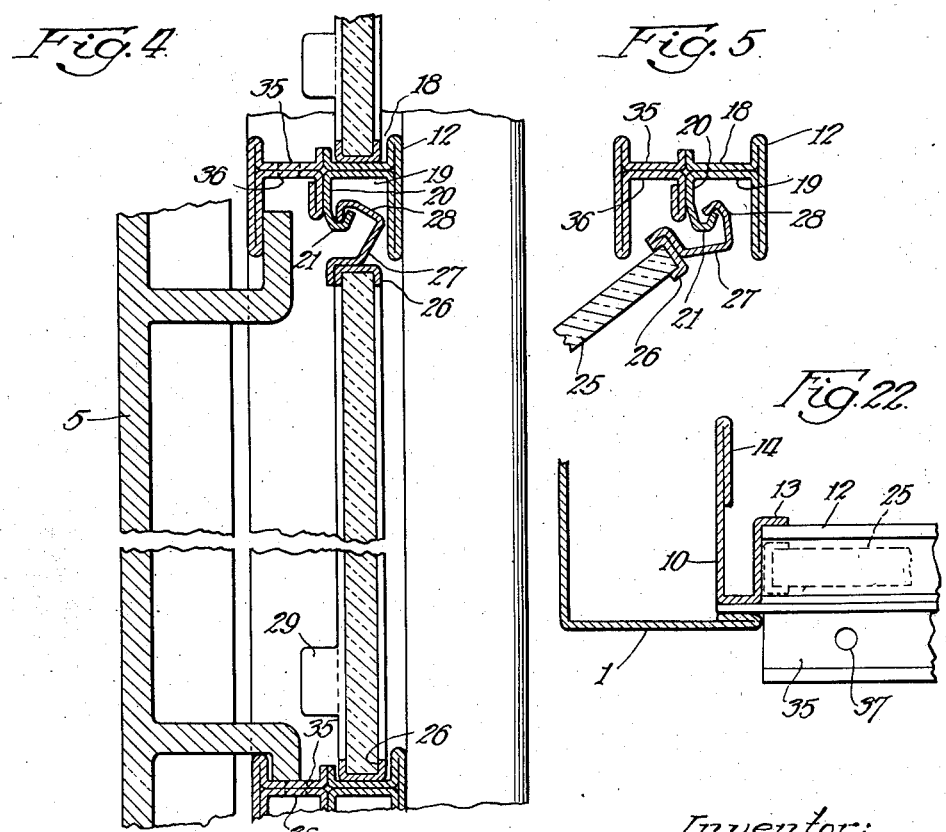

March 16, 1943. B. H. ADLER 2,313,723
CHANGEABLE LETTER SIGN
Filed June 13, 1940 5 Sheets-Sheet 3
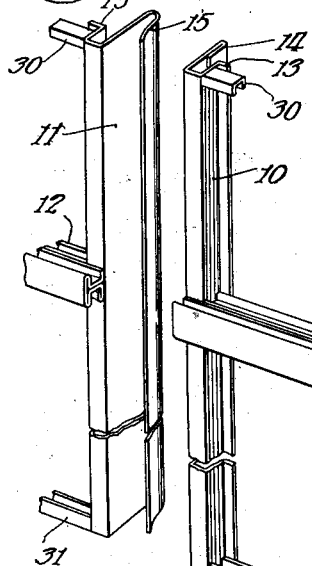
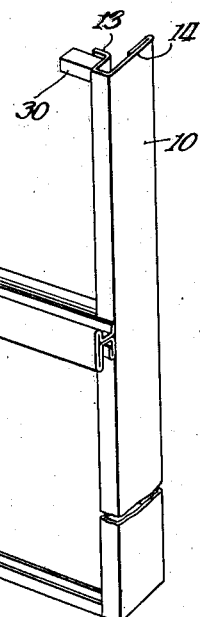
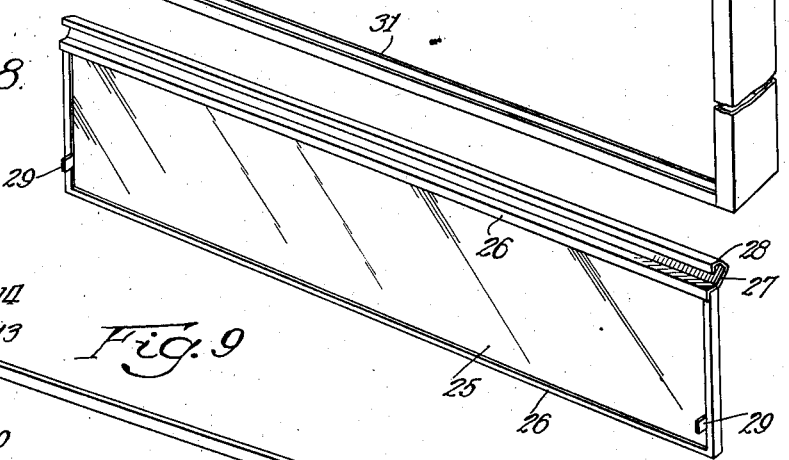
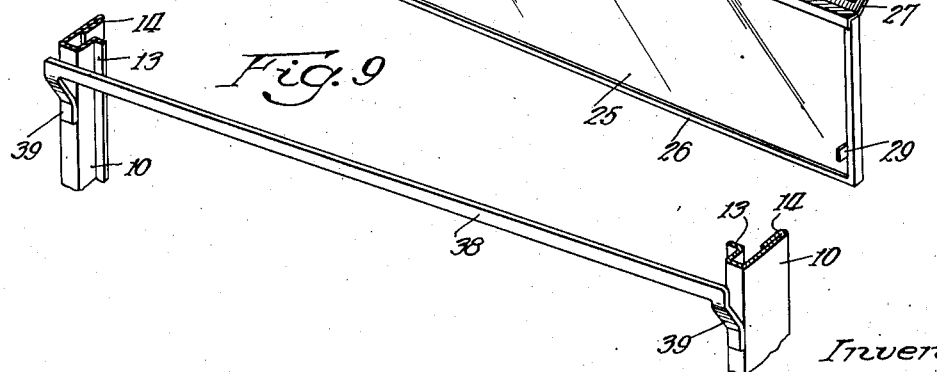
Inventor:
Benjamin H. Adler
By Zabel, Carlson, Gritzbaugh & Wells
Attys.

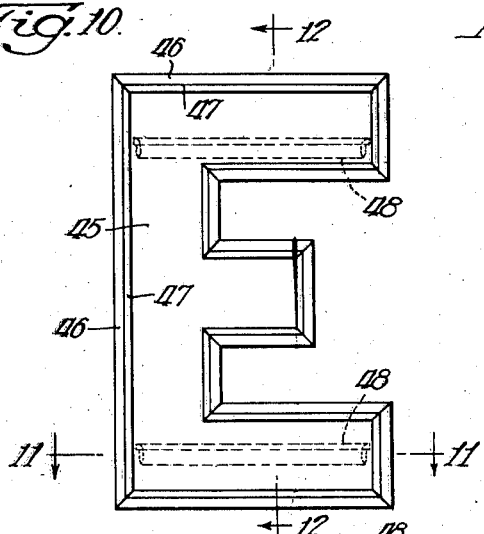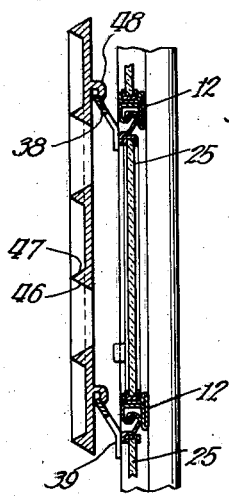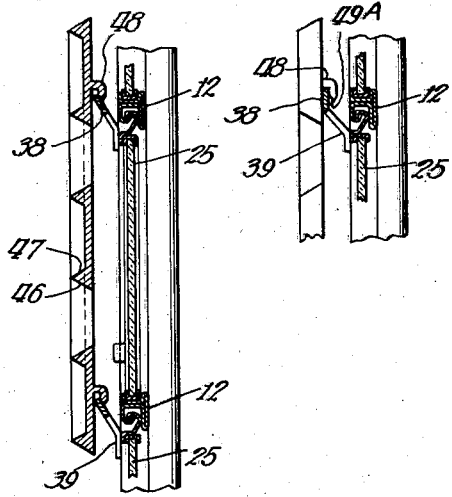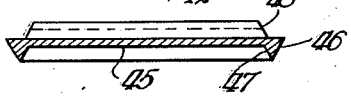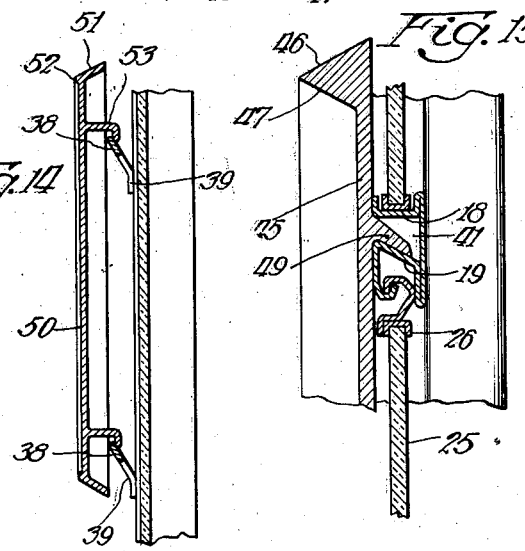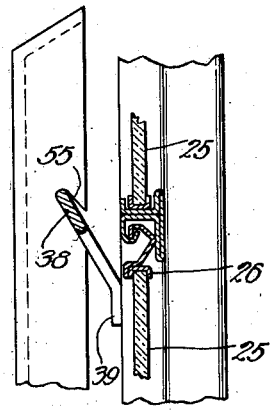

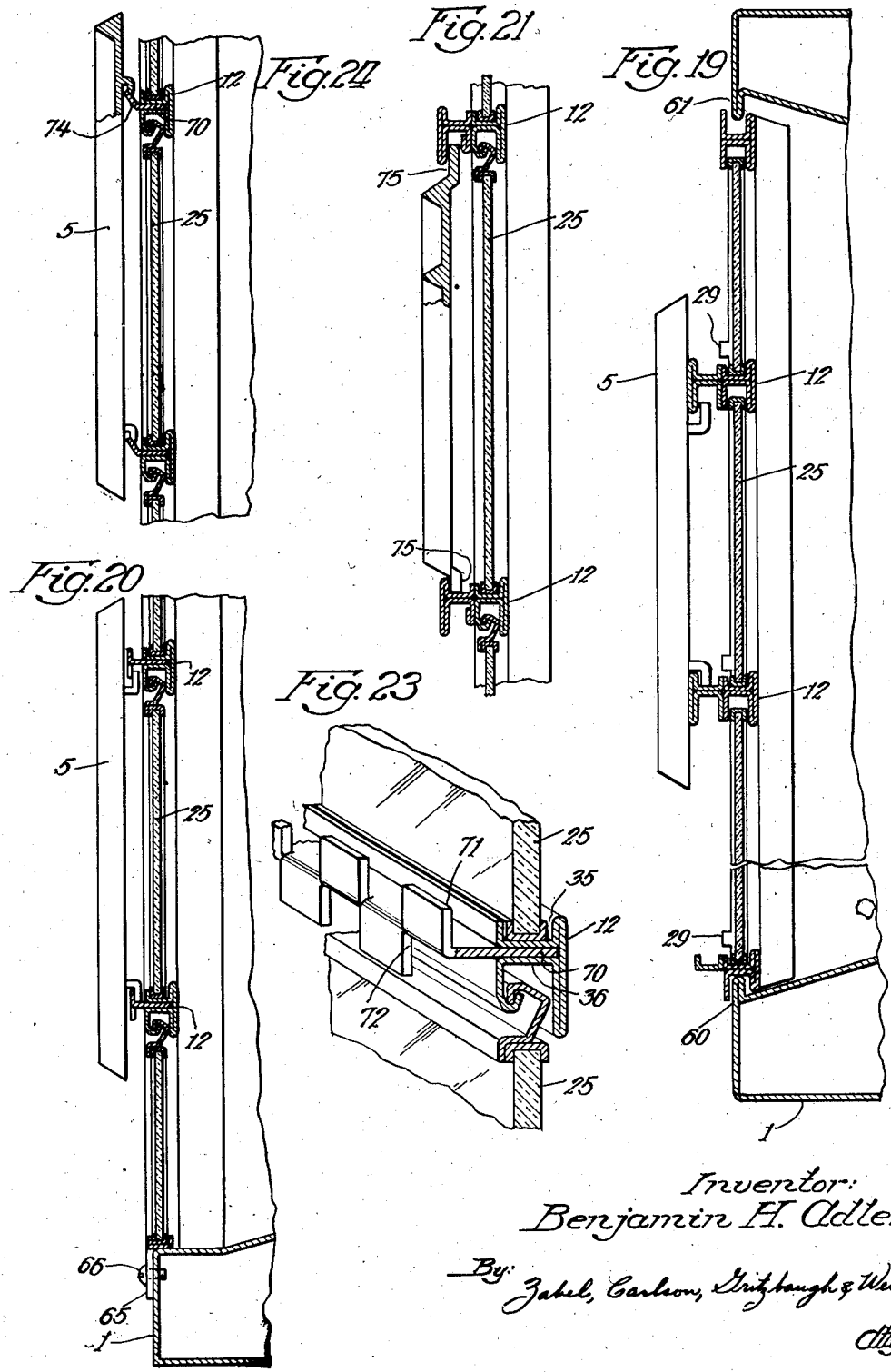

Patented Mar. 16, 1943

2,313,723

UNITED STATES PATENT OFFICE 2,313,723

CHANGEABLE LETTER SIGN

Benjamin H. Adler, Chicago, Ill.

Application June 13, 1940, Serial No. 340,330

14 Claims. (Cl. 40—140)

The present invention relates to changeable signs and removable letters therefor. It is particularly directed to that type of display sign wherein a plurality of panels are arranged in line to provide a large display area upon which letters, figures or designs are mounted and displayed. The display area usually is composed of frames and panels or sheets of suitable material associated with the frames. The sheet material used may be of an opaque or translucent type. Where translucent material is used, it is generally for the purpose of permitting illumination of the display area from a source behind the panels. Such signs are referred to as "silhouette" type because the letters or figures that are mounted in the illuminated area appear in silhouette in front of the panels.

Silhouette signs of this general character usually comprise a so-called sign box, one side or several sides thereof being open to permit the mounting of the display area. The open side or sides of this sign box may be provided with means to removably receive the framework of the display area. This means may be in the form of channels, or rails, or any other suitable means cooperating with the frames. Arranged within the sign box is a plurality of light sources, such as electric lamps or fluorescent tubes, adaptable to uniformly illuminate the translucent panels of the display area. Disposed in front of the display area are means upon which are mounted the various character means, such as letters, figures and designs, which are arranged to convey the desired message to the public.

Signs of this general character find their greatest use on marquees in front of theatres, hotels, or other establishments wherein the feature attractions periodically change. Consequently, the primary object of workers in this art is to provide an attractive attention-compelling sign on which the message easily may be changed, and which can be maintained and serviced with a minimum amount of labor. The present invention is directed towards signs of this general character.

Certain features relating to my various details in silhouette sign construction and disclosed in connection with the present invention are subject matter of my co-pending applications, Serial No. 263,704, filed March 23, 1939, for Signs, and Serial No. 308,413, filed December 9, 1939, for Signs. Certain modifications are herein made in some of my prior disclosed features in order to accommodate the present invention.

One object of the present invention is to provide an improved panel mounting means whereby an individual panel or sheet may be swung outwardly to provide easy access to the interior of the sign box or illuminating compartment. Many repairs, such as replacement of a burned out lamp, are of a relatively simple nature and should require only a few moments of a workman's time. Consequently, such repairs should be made possible without the necessity of completely removing a panel from the sign box. As more complex repairs and periodic cleaning are sometimes necessary, it is, of course, desirable to be able readily to remove the panels from the sign box. Therefore, I have provided a novel hinge construction which permits the panels, in addition to being swung outwardly, to be removed individually from the display area.

The present invention contemplates a novel panel mounting whereby the panels are securely retained in position in the framework, but which nevertheless permits the individual panel easily to be swung outwardly, or to be completely removed from the framework, or both.

In one form of my invention, I provide in conjunction with my novel panel mounting means and integral therewith, means for mounting my improved letter units on the face of the display area. As will be understood, the silhouette sign requires the display area to be as free as possible from any irregularities which tend to detract from a continuously illuminated background. Certain practical considerations make it desirable to provide a display area made up of a plurality of relatively small removable panels with the result that the panel mounting means do interrupt the continuity of the background to a certain extent. By combining the means for mounting the letter units with such panel mounting means, I have tended to minimize such objectionable features.

In view of the many advantages in providing hinged and removable panel mounting means, I include in the present disclosure many modifications particularly showing adaptability of my invention to numerous frameworks and in connection with various letter mounting means. For example, the present invention is particularly adapted to use in connection with my locked-in-line frames such as disclosed in my above mentioned prior applications. The necessary modifications in such frames are herein disclosed in considerable detail.

Other objects and advantages of the present invention will appear more fully as the description proceeds, reference being had to the accompanying drawings wherein preferred forms of the invention are shown. It is to be understood, however, that the drawings and descriptions are illustrative only and are not to be taken as limiting the invention except insofar as it is limited by the claims.

In the drawings—

Fig. 1 is a fragmentary view in front elevation of a portion of a silhouette sign of the multi-decker type, capable of taking interchangeably several lines of display letters, and letters of different heights and sizes;

Fig. 2 is a sectional view taken substantially on the line 2—2 of Fig. 1;

Fig. 3 is a somewhat enlarged sectional view on the line 3—3 of Fig. 1;

Fig. 4 is a somewhat enlarged sectional view of my improved panel mounting means shown in conjunction with one form of letter mounting means and engaging letter;

Fig. 5 is a sectional view of my panel mounting means showing a panel swung outwardly;

Fig. 6 is a perspective view of my invention embodied in a lock-in-line framework;

Fig. 7 is a perspective view of a portion of an adjacent frame adapted to engage the framework of Fig. 6;

Fig. 8 is a perspective view of my removable panel adapted to engage the supporting framework shown in Fig. 6;

Fig. 9 is a perspective view of a portion of my framework showing a modified form of letter mounting means;

Fig. 10 is a view in front elevation of my flat-back letter embodying the novel features hereinbefore referred to;

Fig. 11 is a sectional view on the line 11—11 of Fig. 10;

Fig. 12 is a sectional view on the line 12—12 of Fig. 10, illustrating also a modified letter mounting means in connection with my hinged panel construction;

Fig. 13 is a sectional view illustrating still another letter mounting means in connection with my invention;

Fig. 14 is a sectional view of my new beaded letter hereinbefore referred to;

Fig. 15 is a sectional view of my hinged construction showing still another letter mounting means in connection therewith, and showing a modified form of my new letter mounted therein;

Fig. 16 is a sectional view showing still another letter mounting means;

Fig. 17 is a sectional view disclosing a concave letter mounted in a modified form of the present invention, Fig. 18 is a sectional view of my new flat-back letter and a possible mounting therefor;

Fig. 19 is a fragmentary sectional view showing a modification with the hinge element left off the top of the removable panel and showing a different form of mounting the framework to the sign box;

Fig. 20 is a fragmentary sectional view illustrating a different form of mounting the framework to the sign box and illustrating a modified letter supporting means;

Fig. 21 is a sectional view illustrating the application of lugs to the top and bottom edges of the letters for mounting the letters in channels;

Fig. 22 is a fragmentary sectional view showing another way in which an end framework may be received in the end of the sign box opening;

Fig. 23 is a fragmentary perspective view showing the letter mounting means illustrated in Fig. 20; and Fig. 24 is a sectional view showing still another letter mounting means.

Referring now to the drawings, and particularly to Figs. 1 and 2, the present invention is shown as applied to a sign box 1 which may have suitable illuminating devices such as lamp 2 mounted therein. The lamps 2 are arranged in spaced relationship so as to obtain a substantially even distribution of light throughout the interior of the sign box 1. Sometimes fluorescent tubes are used instead of electric lamps. Sign box 1 is usually constructed of sheet metal and as shown in Fig. 2 is provided with an upper channel 3 and a lower channel 4 at the front thereof. Figs. 19 and 20 illustrate among other things other means for mounting the framework on the sign box. These mounting means are adapted to receive the plurality of frameworks which are arranged in line to make up the display area. These frameworks, hereinafter described in detail, are adapted to support a plurality of letters, characters, or designs 5 in order to convey the desired message to the public. In signs of substantial height spaced tie-rods 6 connect the frameworks to the rear of the sign box in order to increase rigidity in the structure. As will be understood, the letters 5 are customarily made in several sizes to permit some latitude in making up an attractive display.

My preferred framework construction is perhaps best shown in Figs. 3, 6, 7 and 8. This frame structure comprises end uprights 10 and 11. Vertically spaced horizontal panel supporting members 12 extend between the end uprights and are attached thereto by any convenient means, such as spot-welding. The end uprights 10, of the particular framework such as that shown in Fig. 6, are modified channel members having their open faces extending rearwardly of the framework. The flanges of these channels have portions thereof bent, in one case to provide flanges 13 which overlap the edges of the insertable glass panels. The outer flanges of each end upright 10 have a portion thereof bent upon itself as shown at 14. As will be understood the flanges 13 cooperate with the panels to provide a light-tight joint. The end upright members 11 of adjacent frameworks are also channel members and are provided with similar panel overlapping flanges 13. A portion of the outer flanges of these panels is bent outwardly as shown at 15 to provide a channel adapted to receive the flange 14 of an adjacent framework. This construction is substantially similar to that disclosed in my copending application Serial No. 263,704 referred to above. As will be understood, portions of adjacent end uprights overlap to secure the frames in line and prevent the passage of light. As will be understood, the framework shown in Fig. 6 can be removed from the sign box without disturbing any of the other frameworks.

The spaced horizontal panel supporting members 12 may be attached to the end uprights at intervals corresponding to the spacing of the letter mounting means on the back of the letters. Figs. 4 and 5 are cross sectional views of the members 12. Said members 12 comprise an upwardly facing channel 18 and a downwardly facing channel 19. Front flange 20 of the downwardly facing channel has a portion thereof bent inwardly upon itself to provide an elongated hook structure 21 to cooperate with panel members as hereinafter described.

A plurality of individual panels 25 are adapted to be mounted on the above described framework. These panels usually comprise sheets of translucent material. Channels 26 enclose the edges of the sheets and provide increased rigidity in the panel. The channel disposed along the upper edge of the sheet is provided with an upwardly extending flange 27 which is longitudinally bent to form a supporting hook as designated by 28. As will be understood from Figs. 4 and 5 the hooks 21 and 28 cooperate to pivotally support the panel 25. Small lugs 29 project from the lower corners of the panel 25 to provide gripping means whereby the panel may be swung outwardly.

In order to mount the individual panels in the supporting framework, it is necessary firstly to engage the cooperating hook portions and, secondly, to seat the lower edge of the panel in the upwardly facing channel 18.

Conversely, a panel may be swung outwardly by utilizing the lugs 29 manually to raise the panel out of the channel 18. Thus free, the panel may be swung outwardly to provide access to the interior of the sign box. To remove the panel completely from the framework, it is necessary only to disengage the cooperating hook members.

It is often desirable to provide non-removable panels at the top and bottom of the frame. In this case, as shown in Fig. 6, the upper panel would be held in place by small channels 30 attached to the upper end of the end uprights. The bottom ends of the end uprights may be connected with an upwardly facing channel 31 in which is seated the bottommost panel.

Having thus described my improved supporting framework and associated panels, which together make up the display area of my silhouette sign, I now pass to a consideration of my letter units and means for mounting such units on the face of the sign.

In one form of my invention, my letter mounting means comprise channel members 35 and 36, shown clearly in Fig. 4, which may be integral with the above described horizontal panel supporting members. Such a combination is advantageous in that it tends to minimize objectionable interruptions in the face of the display area. The channels 35 and 36 of adjacent units cooperate to receive and retain letter units provided with rearwardly extending lugs as hereinafter described. Holes 37 in channels 35 and 36 prevent accumulation of water which would freeze and interfere with ready removal of the sign letters. In the modification shown in Fig. 9 I use a horizontal bar 38 extending across the front of the framework. The ends of the bar 38 are bent to form bracket 39 by means of which the unit is mounted on the frame uprights. The bar 38 should extend across the framework immediately in front of the horizontal members 12 in order not to interfere with removal of the panels.

In the modification shown in Figs. 15 and 17 the letter mounting means comprises an inclined channel 41 disposed between the channels 18 and 19. This is a very satisfactory mounting means because it eliminates any projects from the display area.

Referring to Figs. 10, 11 and 12, there is illustrated a form of letter or character which is particularly advantageous when used in connection with silhouette signs of this general character. As illustrated, the body of the letter 45 may be made of relatively thin material, and is provided at its periphery with bevels 46 and 47 which give the letter an appearance of substantial depth when mounted on an illuminated background. The silhouette effect is materially enhanced by finishing the body portion 45 in a color contrasting with that of the bevel 46 or 47. As will be understood, the recessed letter surface is protected from marring or scratching. The beveled edges lend increased strength to the letter, making it less liable to warp or bend. Means for mounting the letter on the sign structure extend rearwardly from the back of the letter. As shown in connection with this letter my mounting means preferably takes the form of angular lugs 48 extending across the letter. The outer flange of the upper lug projects upwardly, and the outer flange of the lower lug projects downwardly to securely engage the channels 35 and 36 disposed in front of the display area (see Fig. 4).

It is to be understood that any of the various letter mounting means may be used in combination with any of the specific letters herein disclosed. For example, the outer flanges of the angles 48 may extend in opposite directions, in order that the letter may be mounted in the channels shown in Fig. 4. Also my improved flat-back letter may be provided with inclined flange 49, as disclosed in Fig. 15, to permit mounting in the inclined channel 41. In certain forms of my invention the letter mounting bars 38 are angularly disposed with respect to the plane of the panels. Such a bar is shown in Figs. 12, 14 and 18. For use with such a bar, the cooperating flange on the back of the letter is provided with a beveled edge 49A, best shown in Fig. 13, which bears fully on the bar, as shown in Fig. 12.

Fig. 14 is a sectional view of another form of letter. This particular construction has a body portion 50 and is provided at its periphery with rearwardly extending flanges 51. At the junction of the flanges 51 with the body portion 50 is bead 52. This bead 52 has the effect of clearly defining the outline of the letter regardless of the angle from which the letter is viewed. Means 53 for mounting the letter on the display area project from the rear of the letter and within its outline and may take any of the various forms discussed above.

Fig. 16 discloses a peripherally flanged letter, in the flanges of which are inclined slots 55. These slots are adapted to receive the letter mounting bars 38 whereby the letter is supported in spaced relation to the panels. The slot 55 may be slightly tapered, thereby gripping the bars securely to oppose sidewise slipping of the letters.

In the forms of my invention wherein a letter supporting rod is disposed in front of the panels, the rod supporting brackets at the end of the rod are usually attached to the end uprights of the framework.

In Fig. 19 I illustrate a modified form of means for mounting my removable framework in the sign box. Instead of utilizing channels at the top and bottom of the opening in the sign box, I provide flanges 60 and 61. In this case horizontal channel members are provided at the top and bottom of the framework and are adapted to removably engage said flanges. It will be noted in Fig. 19 that the panels 25 are not adapted to swing outwardly. The construction does, however, permit removal of the panels 25 from the framework.

Another form of my invention is shown in Fig. 20. In this form the frameworks are adapted to be fixed to the sign box more or less permanently. The frame uprights 10 and 11 have the back portion thereof cut away for a short distance from the ends of the uprights. The reduced portion of the uprights closely fits the opening in the sign box. The end portions 65 of the uprights overlap the marginal face of the sign box and may be secured thereto by means 66. This construction may be desirable in view of the fact that the removable framework feature may be considered unnecessary in addition to removable panels. The ends of uprights 10 and 11 need not, however, be cut away, and the framework may be fastened in the sign box opening by any suitable means. In this modification the hinge construction is present to permit the panels to be swung outwardly.

The modified letter supporting means illustrated in Fig. 20 is shown in detail in Fig. 23. This letter supporting means comprises a strip of material 70 disposed between channels 35 and 36 of the horizontal panel supporting member 12 and throughout the length thereof. The strip 70 projects somewhat in front of the display area and such projecting portion is provided with spaced slits. The spaced slits divide the projecting portion into a series of lugs. Alternate lugs have their free ends bent upwardly as shown at 71 and the free ends of the intermediate lugs are bent downwardly as shown at 72. As will be understood this construction is substantially equivalent to the channels shown in other forms of my invention and are adapted to receive the same letters. It presents some advantages thereover, particularly in economy of manufacture. The disclosure of Fig. 24 utilizes the strip 70 disposed between channels 35 and 36. Here, however, projecting portion 74 is bent upwardly at an angle with the display area and is adapted to receive letter units as shown. Suitable drainage means, such as holes or slots, may be provided in the strip.

In the modification shown in Fig. 21 the flat back letter is provided at the top and bottom with marginal lugs 75, which lugs are adapted to engage the channel letter mounting means. The letter may of course be mounted on the letter mounting means shown in Fig. 23.

In the modification shown in Fig. 22 another method of mounting the side of an end framework in the sign box is shown. In this case the web and the front flange of letter supporting channels 35 and 36 are terminated short of the end uprights 10. The end uprights 10 and the back flange of the channels attached thereto are overlapped by the marginal edge of the sign box 1, thereby providing a light tight joint at their junction.

From the above description, it will be apparent that I have provided certain improvements in silhouette sign construction. I have provided a display area made up of a plurality of supporting frameworks, each framework being adapted to pivotally support a plurality of translucent panels. The adjacent frame structures are adapted to overlap the edges of one another and thereby prevent any passage of light at their joints. This overlapping feature also permits the frames to be locked securely in line. In combination with the framework I have disclosed various means for mounting the removable letter units in front of the display area.

It is, of course, necessary to remove the letter units from a particular panel before such panel may be swung outwardly. To facilitate such removal, the letter mounting means on one framework is adapted substantially to abut the letter mounting means on adjacent frameworks. This, as has been pointed out above, permits the letter units to be slid from one framework to the next. As the workman is usually operating from a ladder at some height, the convenience of this arrangement will readily be appreciated.

In addition to the improved frame and panel construction I have disclosed novel character units especially adapted for use therewith. It is to be appreciated that many combinations involving the present disclosures are possible. Therefore, it is not my idea that the present invention shall be limited by the few illustrations I have chosen to show. Any combinations possible from the specific features disclosed herein are contemplated in the present invention.

From the foregoing illustrative description it is believed that the construction and advantages of the present invention will be readily apparent to those skilled in this art. Having thus described my invention, what I claim as new and desire to secure by Letters Patent is:

1. In a changeable display sign, a combination including a framework comprising uprights and spaced horizontal members attached to said uprights, a plurality of translucent panels removably supported by said framework, said horizontal members being channels having substantially an H-shaped cross-section, the upwardly facing channel thereof being adapted to receive the lower edge of a panel, the downwardly facing channel having a flange extending interiorly thereof, and flanges on the upper edges of said panels whereby to cooperate with said first named flanges to pivotally support said panels.

2. In a changeable display sign, a combination including a framework having spaced horizontal panel supports, said supports comprising an upwardly facing channel adapted to receive the lower edge of a panel, and a downwardly facing channel, said latter channel having one of its flanges bent inwardly at an angle, and translucent panels adapted to be carried by said supports, said panels having flanges on the upper edges thereof whereby to cooperate with said bent flanges to pivotally support said panels.

3. In a changeable display sign, a display area comprising a plurality of adjacent frames and translucent panels mounted therein, said frames including uprights having interlocking means adapted to overlap the junction line of said frames and lock the frames in line, spaced horizontal members attached to said uprights, flanges on said horizontal members and flanges on said panels engaging said first named flanges whereby said panels, or any of them, may be swung away from the plane of said display area.

4. In a changeable display sign, a display area comprising a plurality of adjacent frames and translucent panels mounted therein, said frames including uprights having interlocking means adapted to overlap the junction line of said frames and lock the frames in line, spaced horizontal members attached to said uprights, said horizontal members each comprising an upwardly facing channel adapted to receive the lower edge of a panel, and a downwardly facing channel, said latter channel having one of its flanges bent inwardly at an angle, and flanges on the upper edges of said panels whereby to cooperate with said first named flanges to pivotally support said panels.

5. In a changeable display sign, a combination including a framework comprising uprights and spaced horizontal panel supports attached to said uprights, a plurality of translucent panels pivotally mounted between adjacent horizontal supports, letters supporting means carried by said framework, and letter units adapted to removably engage said means.

6. In a changeable display sign, a combination including a framework comprising uprights and spaced horizontal panel supports attached to said uprights, a plurality of translucent panels pivotally mounted between adjacent horizontal supports, letter supporting means carried by said framework, and letter units adapted to removably engage said means, said letter supporting means extending across the framework adjacent said horizontal panel supports to permit said panels to be swung outwardly.

7. In a changeable display sign, a combination including a framework comprising uprights and spaced horizontal panel supports attached to said uprights, a plurality of translucent panels pivotally mounted between adjacent horizontal supports, letter supporting means carried by said framework, and letter units adapted to removably engage said means, said letter supporting means being channel members substantially integral with said horizontal panel supports.

8. In a changeable display sign, a combination comprising a plurality of adjacent frames, said frames including uprights having interlocking means adapted to overlap the junction lines of said frames and lock the frames in line, spaced horizontal panel supports attached to said uprights, a plurality of translucent panels pivotally mounted between adjacent horizontal supports, letter supporting means carried by said frames, and letter units adapted to removably engage said means.

9. In a changeable display sign, a combination comprising a plurality of adjacent frames, said frames including uprights having interlocking means adapted to overlap the junction lines of said frames and lock the frames in line, spaced horizontal panel supports attached to said uprights, a plurality of translucent panels pivotally mounted between adjacent horizontal supports, letter supporting means carried by said frames, and letter units adapted to removably engage said means, said letter supporting means extending across the frame adjacent said horizontal panel supports to permit said panels to be swung outwardly.

10. In a changeable display sign, a combination comprising a plurality of adjacent frames, said frames including uprights having interlocking means adapted to overlap the junction lines of said frames and lock the frames in line, spaced horizontal panel supports attached to said uprights, a plurality of translucent panels pivotally mounted between adjacent horizontal supports, letter supporting means carried by said frames, and letter units adapted to removably engage said means, said letter supporting means being channel members substantially integral with said horizontal panel supports.

11. In a changeable display sign, a panel supporting frame including uprights, and spaced horizontal members attached thereto, said members comprising an upwardly facing channel and a downwardly facing channel, said latter channel having one of its flanges bent inwardly at an angle, and translucent panels adapted to be carried by said horizontal members, said panels having flanges on the upper edges thereof whereby to cooperate with said bent flanges to pivotally support said panels, inclined letter supporting recesses between said channels of said horizontal members, and letter units having lugs thereon adapted to seat in said recesses.

12. In a changeable display sign, a combination including a framework comprising uprights and spaced horizontal panel supports attached to said uprights, a plurality of translucent panels pivotally mounted between adjacent horizontal supports, letter supporting means carried by said framework, and letter units adapted to removably engage said means, said letter supporting means comprising horizontally running members terminating at the uprights and positioned to accommodate forward swinging of the translucent panel without interference, said horizontally running members being aligned end to end so that letters thereon may be slidably passed from alongside one panel to alongside another to enable the first panel to swing on its pivot.

13. In a changeable display sign, a combination including a framework comprising uprights and spaced horizontal members attached to said uprights, a plurality of translucent panels supported by said framework, at least some of said panels being pivotally mounted on said framework whereby said pivoted panels may be swung away from the plane of said display area, said framework including horizontally arranged supports for removable letters, said letter supports being adjacent the horizontally running junction lines of the panels.

14. In a changeable display sign, a combination including a framework comprising uprights and spaced horizontal members attached to said uprights, a plurality of translucent panels supported by said framework, letter supporting means carried by said framework, said letter supporting means comprising spaced lugs projecting upwardly from said horizontal members and spaced lugs projecting downwardly from said horizontal members and alternating with the first-named lugs, and removable letters having mounting means at the back thereof receiving said lugs.

BENJAMIN H. ADLER.